United States Patent
Johnson et al.

(10) Patent No.: US 9,158,462 B2
(45) Date of Patent: Oct. 13, 2015

(54) TAPE VOLUME ACCESS BLOCK HAVING DATA SET INFORMATION STORED THEREIN

(71) Applicant: International Business Machines Corporation, Armonk, NY (US)

(72) Inventors: Gavin S. Johnson, San Jose, CA (US); Jon A. Lynds, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/151,317

(22) Filed: Jan. 9, 2014

(65) Prior Publication Data

US 2015/0193145 A1 Jul. 9, 2015

(51) Int. Cl.
 G11B 5/584 (2006.01)
 G06F 3/06 (2006.01)
 G11B 27/32 (2006.01)
 G11B 20/12 (2006.01)

(52) U.S. Cl.
 CPC .............. G06F 3/061 (2013.01); G06F 3/064 (2013.01); G06F 3/0686 (2013.01); G11B 20/1201 (2013.01); G11B 27/328 (2013.01); G06F 2003/0698 (2013.01); G11B 2220/65 (2013.01); G11B 2220/90 (2013.01)

(58) Field of Classification Search
 None
 See application file for complete search history.

(56) References Cited

U.S. PATENT DOCUMENTS

| | | | | |
|---|---|---|---|---|
| 5,502,811 A | * | 3/1996 | Ripberger | 714/6.31 |
| 5,576,903 A | * | 11/1996 | Brown et al. | 360/48 |
| 6,049,848 A | * | 4/2000 | Yates et al. | 711/4 |
| 6,343,342 B1 | * | 1/2002 | Carlson | 711/112 |
| 6,356,803 B1 | | 3/2002 | Goodman et al. | |
| 6,525,894 B1 | * | 2/2003 | Nakamura | 360/49 |
| 6,816,941 B1 | * | 11/2004 | Carlson et al. | 711/111 |
| 6,868,429 B2 | * | 3/2005 | Fontijn | 1/1 |
| 7,864,478 B2 | * | 1/2011 | Anna et al. | 360/69 |
| 7,882,081 B2 | * | 2/2011 | Stager et al. | 707/691 |
| 8,255,738 B2 | | 8/2012 | Iwasaki et al. | |
| 8,285,762 B2 | * | 10/2012 | Cannon et al. | 707/825 |
| 8,760,781 B2 | * | 6/2014 | Johnson et al. | 360/31 |
| 2005/0050265 A1 | * | 3/2005 | Dahman et al. | 711/111 |
| 2005/0050267 A1 | * | 3/2005 | Yamamoto et al. | 711/113 |
| 2010/0257437 A1 | * | 10/2010 | Hwang et al. | 714/819 |
| 2011/0238716 A1 | * | 9/2011 | Amir et al. | 707/823 |
| 2012/0110257 A1 | * | 5/2012 | Enohara et al. | 711/111 |
| 2013/0080831 A1 | * | 3/2013 | Nishijo et al. | 714/15 |
| 2013/0293978 A1 | * | 11/2013 | Johnson et al. | 360/31 |

OTHER PUBLICATIONS

Williams et al., "Progress in Defining a Standard for File-Level Metadata," NASA Conference Publication, 1996, pp. 291-299.

* cited by examiner

Primary Examiner — Dismery Mercedes
(74) Attorney, Agent, or Firm — Zilka-Kotab, PC

(57) ABSTRACT

In one embodiment, an apparatus includes a processor and logic integrated with and/or executable by the processor, the logic being configured to write one or more data sets to a magnetic tape volume, the magnetic tape volume being configured to store data thereon, determine metadata corresponding to the one or more written data sets, and write the metadata corresponding to the one or more written data sets to a tape volume access block (TVAB) stored to the magnetic tape volume after a last written data set. In yet another embodiment, a method for managing a magnetic tape volume includes auditing a magnetic tape volume to determine a plurality of data sets stored thereto, determining metadata corresponding to the plurality of data sets, storing the metadata corresponding to the plurality of data sets to a TVAB, and writing the TVAB to the magnetic tape volume after a last written data set.

19 Claims, 11 Drawing Sheets

TAPE VOLUME ACCESS BLOCK HAVING DATA SET INFORMATION STORED THEREIN

BACKGROUND

The present invention relates to data storage systems, and more particularly, this invention relates to a tape volume access block (TVAB) stored to a magnetic tape volume for storing information about data sets stored to the magnetic tape volume.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media, e.g., programmable read only memory (PROM), electrically-erasable programmable read only memory (EEPROM), flash PROM, COMPACTFLASH, SMARTMEDIA, MEMORYSTICK, etc., or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data, storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the X and Y directions.

In a tape drive system, the drive moves the magnetic tape over the surface of the tape head at high speed. However, the magnetic tape must be wound to a proper position of the magnetic tape in order for desired information to be read from the magnetic tape. Furthermore, the magnetic tape must be wound to an end thereof in order to store additional data to the magnetic tape.

Conventionally, in an attempt to ascertain at which position the magnetic tape must be positioned in order to read data therefrom, auditing at the volume level may be performed. Auditing at the volume level makes use of either a Control Data Set (CDS), a limited audit of a labeled magnetic tape, etc.

The CDS is typically maintained by a tape management system. The CDS includes information about data sets stored to all magnetic tape cartridges in a tape library and/or across a plurality of tape libraries in an installation Note that the CDS resides in a location which is able to be accessed quickly, such as in a file or data set somewhere in host memory, on a direct access storage device (DASD), etc. That is, the CDS is not kept on the tape volume itself, but in another location which is associated with the tape volume.

When there is no CDS, a limited audit of a labeled tape may be performed, e.g., by reading ail the label structures stored to the magnetic tape. Some exemplary label structures include header labels which precede a data set, toiler labels which follow a data set, etc. The label structures may include information such as the last few characters of the file name (such as 17 characters, but not so limited), a volume sequence number, a generation number, a version number, a creation date, an expiration date, etc. The audit of a tape volume using only the label structures is cumbersome and time consuming. The magnetic tape has to be positioned to the first label structure, which is then read into a memory, such as host storage. Then, the tape is positioned to the next label structure, which is read into memory, and so on for every data set on the tape. Not only is this inefficient, it requires a great deal of input/output (I/O) activity, particularly when a tape volume contains thousands or many thousands of files.

BRIEF SUMMARY

In one embodiment, an apparatus includes a processor and logic integrated with, and/or executable by the processor, the logic being configured to write one or more data sets to a magnetic tape volume, the magnetic tape volume being configured to store data thereon, determine metadata corresponding to the one or more written data sets, and write the metadata corresponding to the one or more written data sets to a tape volume access block (TVAB) stored to the magnetic tape volume after a last written data set.

In another embodiment, a method for managing a magnetic tape volume includes writing one or more data sets to a magnetic tape volume, the magnetic tape volume being configured to store data thereon, determining metadata corresponding to the one or more written data sets, and writing the metadata corresponding to the one or more written data sets to a TVAB stored to the magnetic tape volume after a last written data set.

In yet another embodiment, a method for managing a magnetic tape volume includes auditing a magnetic tape volume to determine a plurality of data sets stored thereto, determining metadata corresponding to the plurality of data sets, storing the metadata corresponding to the plurality of data sets to a TVAB, and writing the TVAB to the magnetic tape volume after a last written data set.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Furthermore, "about" as used herein refers to plus or minus 10% unless otherwise stated. For example, "about 50° C." refers to any temperature between and including 45° C. and 55° C.

The following description discloses several preferred embodiments of magnetic tape drives, as well as operation and/or component parts thereof. In various embodiments described herein, tape drive designs obtain statistics and characteristics for all data sets or files on a volume by creating and maintaining a tape volume access block (TVAB) stored after the last written data set or file stored to the magnetic tape, as will be discussed in detail below. The TVAB provides a single location on the magnetic tape which contains metadata for all data sets or files on the magnetic tape.

In one general embodiment, an apparatus includes a processor and logic integrated with and/or executable by the processor, the logic being configured to write one or more data sets to a magnetic tape volume, the magnetic tape volume being configured to store data thereon, determine metadata corresponding to the one or more written data sets, and write the metadata corresponding to the one or more written data sets to a tape volume access block (TVAB) stored to the magnetic tape volume after a last written data set.

In another general embodiment, a method for managing a magnetic tape volume includes writing one or more data sets to a magnetic tape volume, the magnetic tape volume being configured to store data thereon, determining metadata corresponding to the one or more written data sets, and writing the metadata corresponding to the one or more written data sets to a TVAB stored to the magnetic tape volume after a last written data set.

In yet another general embodiment, a method for managing a magnetic tape volume includes auditing a magnetic tape volume to determine a plurality of data sets stored thereto, determining metadata corresponding to the plurality of data sets, storing the metadata corresponding- to the plurality of data sets to a TVAB, and writing the TVAB to the magnetic tape volume after a last written data set.

Figure 1:
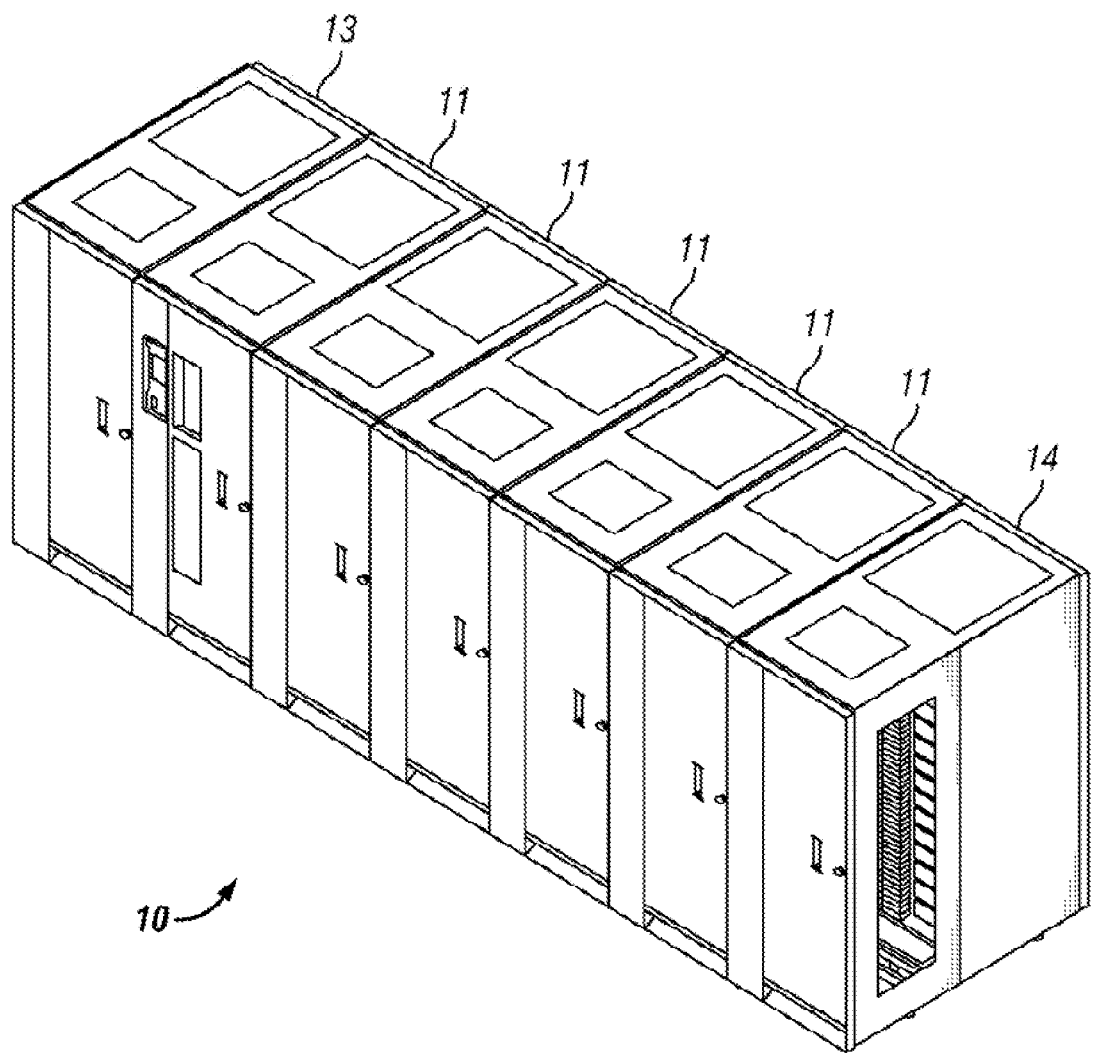
FIG. 1 is a perspective view of an automated data storage library according to one embodiment.
Figure 2:
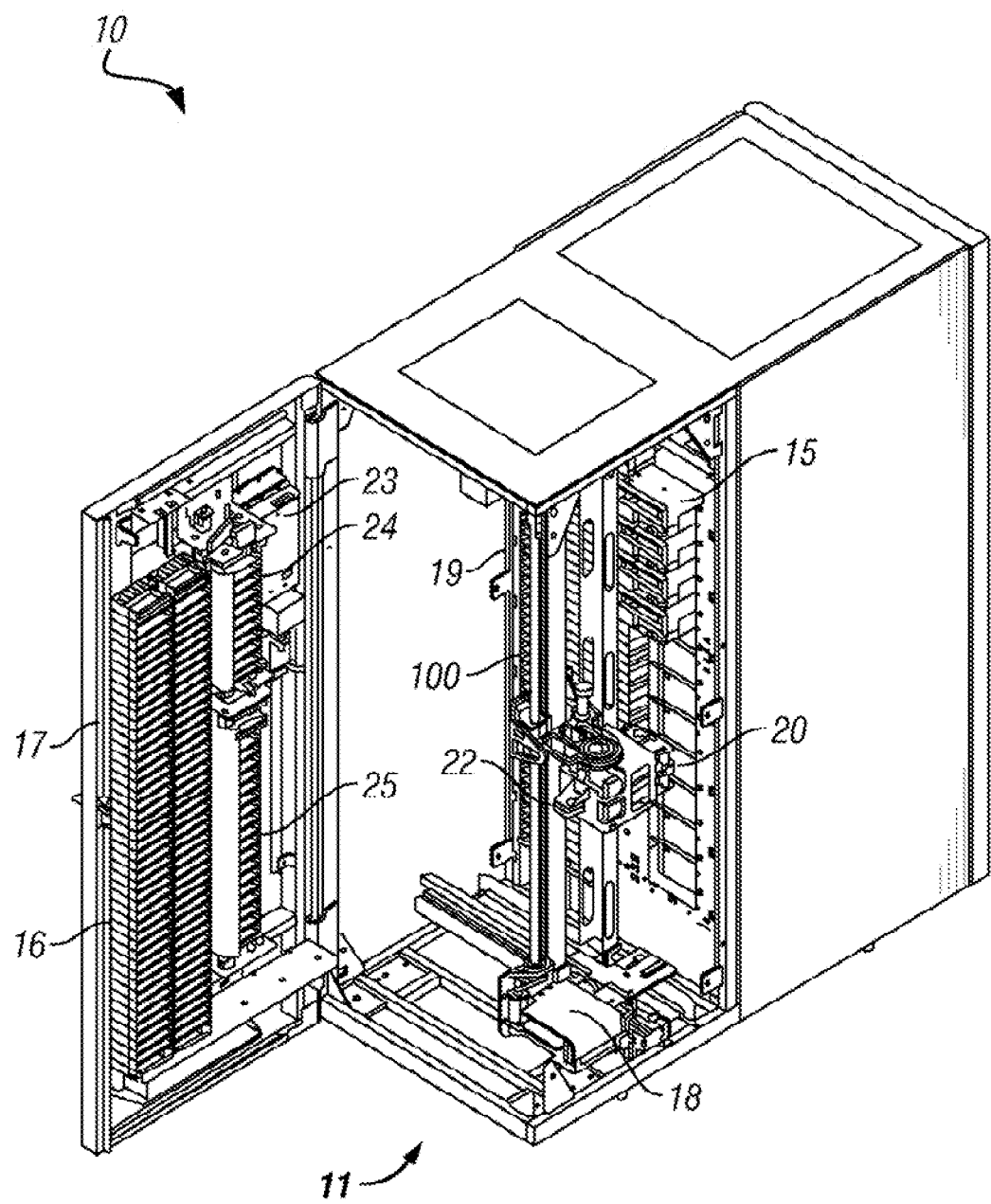
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14, for example. As will be discussed in further detail below, a frame may comprise an expansion component of the library. Thus, storage frames may be added or removed to expand or reduce the size and or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used to storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from, front to rear.

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disk drives, magnetic tape chives, or other types of data storage drives as are used to read and/or write data with respect to the data storage media.

As illustrated, the storage frame 11 may optionally include an operator panel 23 or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner 22 or other reading system, such as a cartridge memory reader or similar system mounted on the gripper assembly 20, to "read" identifying information about the data storage media.

Figure 3:
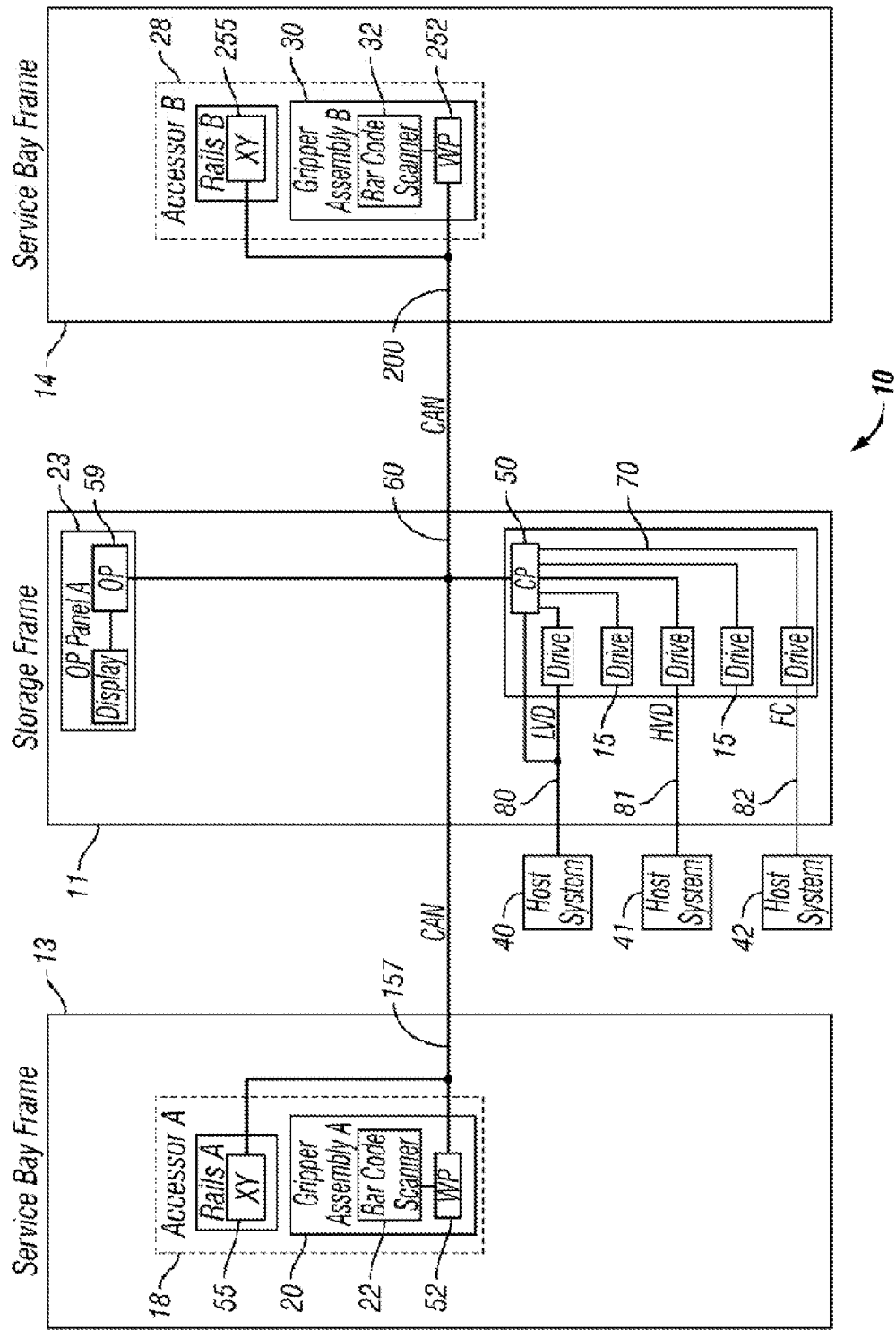
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other figures. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other figures) should be deemed to include any and all possible permutations.

Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes as will be discussed in further detail below.

According to an exemplary embodiment an automated data storage library which may implement the distributed system depicted in the block diagram of FIG. 3, and/or other approaches presented herein, is the IBM 3584 UltraScalable Tape Library. For a fuller understanding of a distributed control system incorporated in an automated data storage library, refer to U.S. Pat. No. 6,356,803, which, is entitled "Automated Data Storage Library Distributed Control System," and is hereby incorporated by reference.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed, as that term, is defined in U.S. Pat. No. 6,356,803.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a reading system 22 to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform, some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage chives 15, etc.

With continued reference to FIG. 3, library 10 receives commands from one or more host systems 40, 41, 42. The host systems 40, 41, 42, such as host servers, communicate with the library directly, e.g., on path 80, through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Welch Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the commination processor node 50 is coupled to each of the data storage drives 15 of a storage frame. 11, via lines 70, and are thereby communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be Small Computer Systems Interface (SCSI) busses. However, bus 82 comprises an example of a Fiber Channel (FC) bus which is a high speed serial data interface, allowing transmission over greater distances than the SCSI bus systems.

According to some approaches, the data storage drives 15 may be in close proximity to the communication processor node 50, and may employ a short distance communication scheme, such as SCSI, or a serial connection, such as RS-422. Thus the data storage drives 15 may be individually coupled to the communication processor node 50 by means of lines 70. Alternatively, the data storage drives 15 may be coupled to the communication processor node 50 through one or more networks, such as a common bus network.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right, hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover the illustrative, control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service hay 13 and network 200 may not be associated with the right hand service bay 14. Moreover, depending on the design of the library, it may not be necessary to have a left hand service bay 13 and/or a right hand-service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. Essentially, the term "library controller" as used herein is intended in its broadest sense as a device that contains at least one computer processor, as such term is defined herein.

Figure 4:
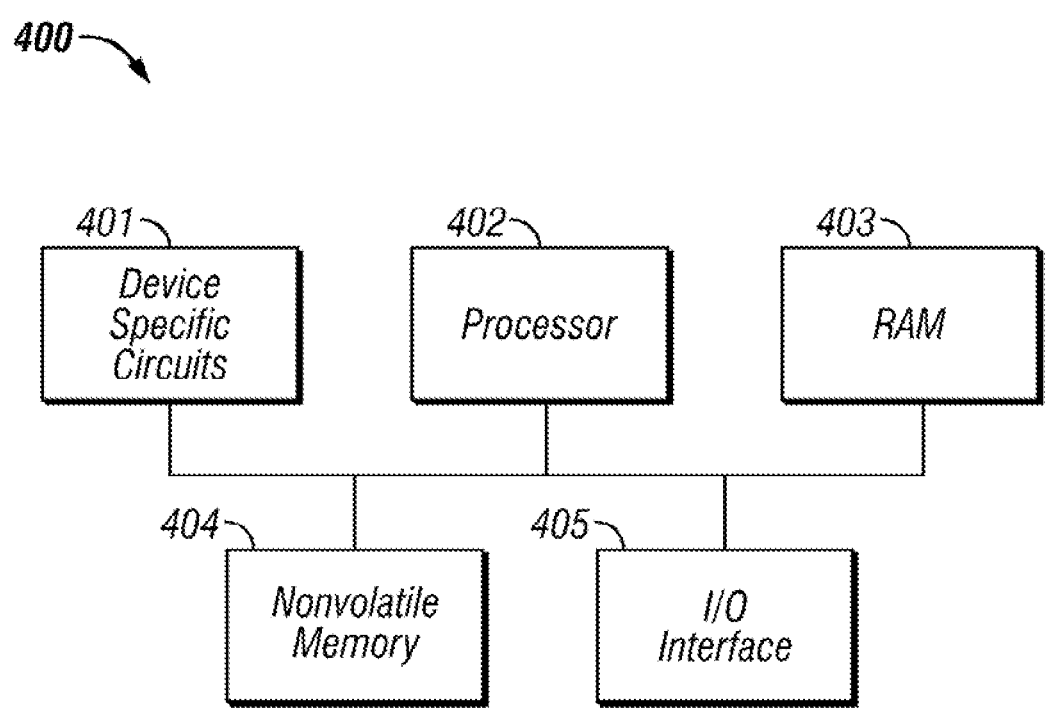
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor. Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, EEPROM, flash PROM, battery backup RAM, hard disk drives, etc. However, the nonvolatile memory 404 is typically used to hold the executable firmware and arty nonvolatile data. Moreover, the I/O interface 405 comprises a communication interface that allows the processor 402 to communicate with devices external to the controller. Examples may comprise, but are not limited to, serial interfaces such as RS-232. Universal Serial Bus (USB), SCSI, etc. The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control. Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
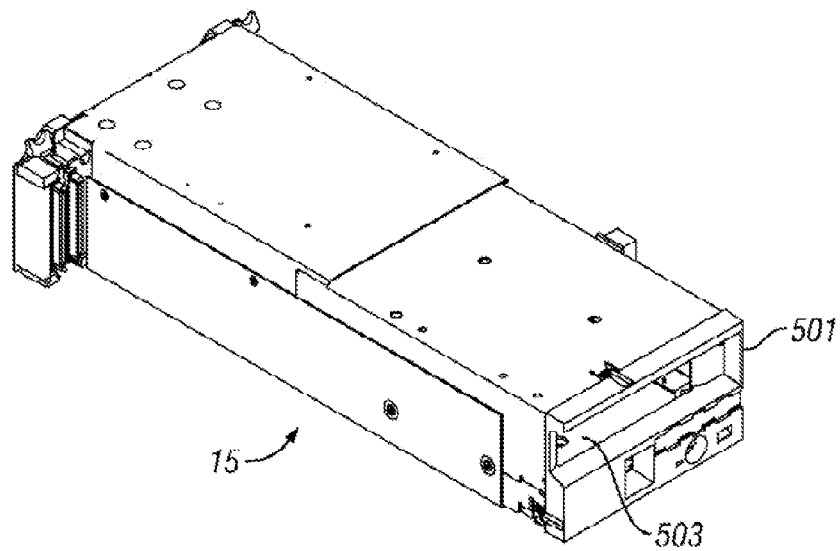
FIG. 5A is a frontal perspective view of a data storage drive according to one embodiment.
Figure 5B:
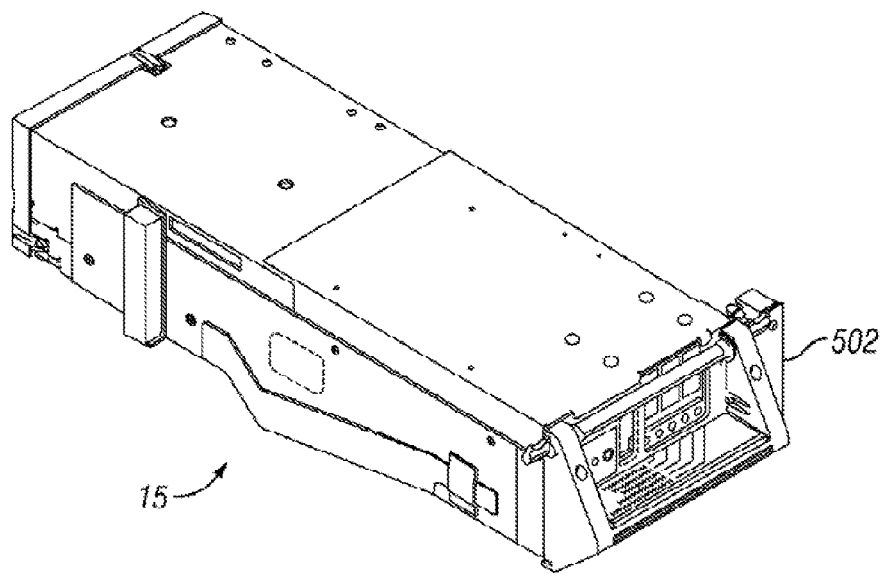
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
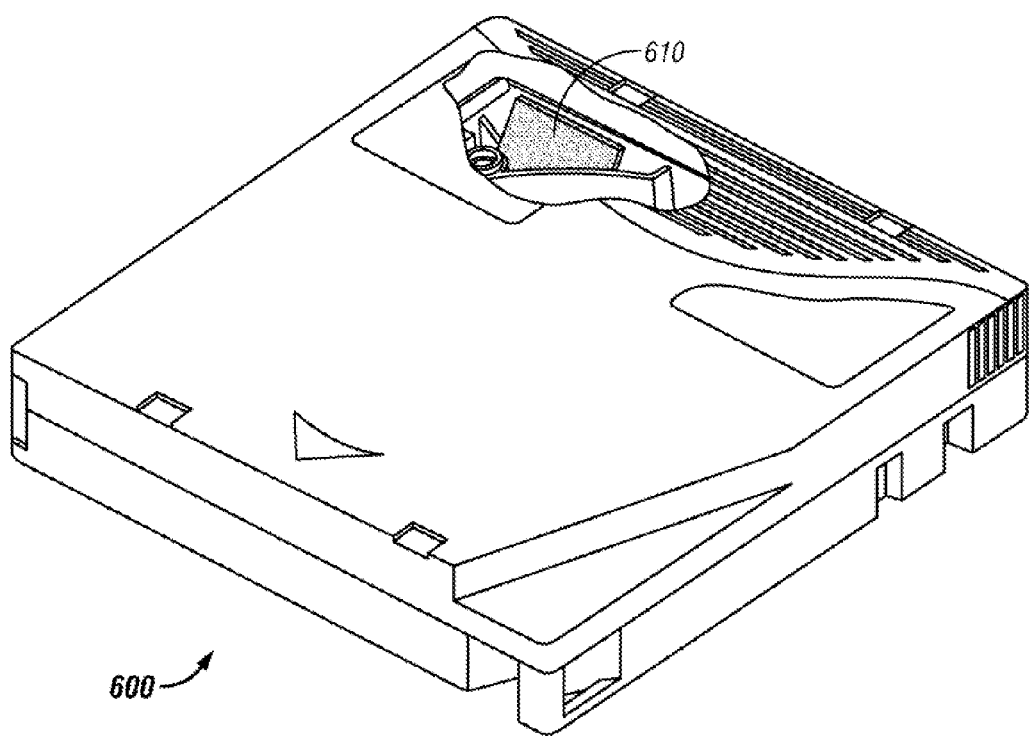
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, disks, etc.; electronic media, e.g., PROM, EEPROM, flash PROM, etc.; or other suitable media. Moreover, an example of a data storage cartridge that is widely employed in automated data storage libraries for mass data storage is a magnetic tape cartridge in which the media is magnetic tape.

Figure 7:
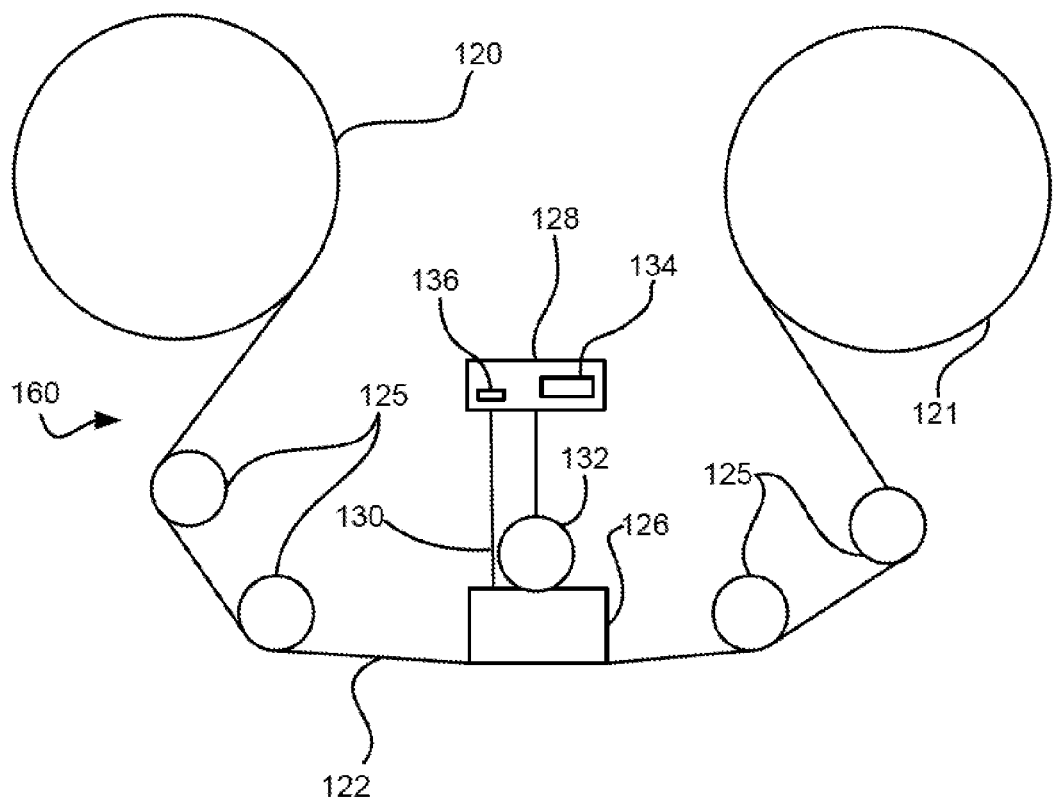
FIG. 7 is a schematic diagram of a simplified tape drive system according to one embodiment.

FIG. 7 illustrates a simplified tape drive 160 of a tape-based data storage system, which may be employed in the context of the present invention. While one specific implementation of a tape drive is shown in FIG. 7, it should be noted that the embodiments described herein may be implemented in the context of any type of tape drive system. For example, the tape cartridge 600 shown in FIG. 6 may be used with a system such as that shown in FIG. 7.

As shown, a tape supply cartridge 120 and a take-up reel 121 are provided to support a tape 122. One or more of the reels may form part of a removable cartridge and are not necessarily part of the system 160. The tape drive, such as that illustrated in FIG. 7, may further include drive motor(s) to chive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. Hie controller 128, may be or include a processor and/or any logic for controlling any subsystem of the drive 160. For example, the controller 128 typically controls head functions such as servo following, data, writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or oilier instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interlace 134 may also be provided for communication between the tape drive 160 and a host (integral or external) to send and receive the data and for controlling the operation of the tape drive 160 and communicating the status of the tape drive 160 to the host, all as will be understood by those of skill in the art.

Figure 8A:
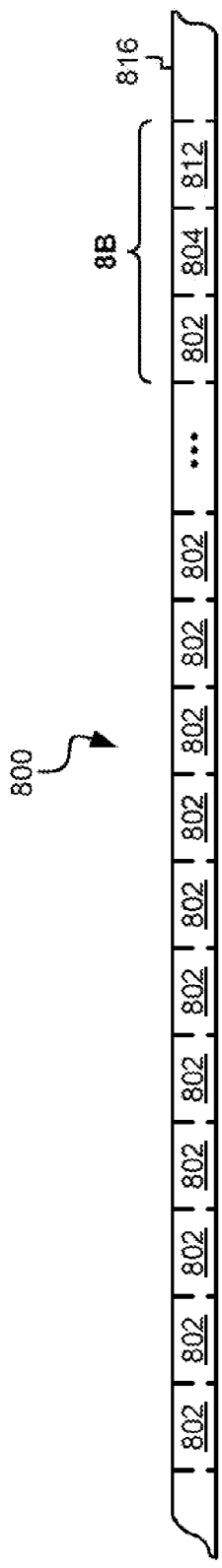
FIGS. 8A-8B show schematic diagrams of a magnetic tape layout, according to one embodiment.
Figure 8B:
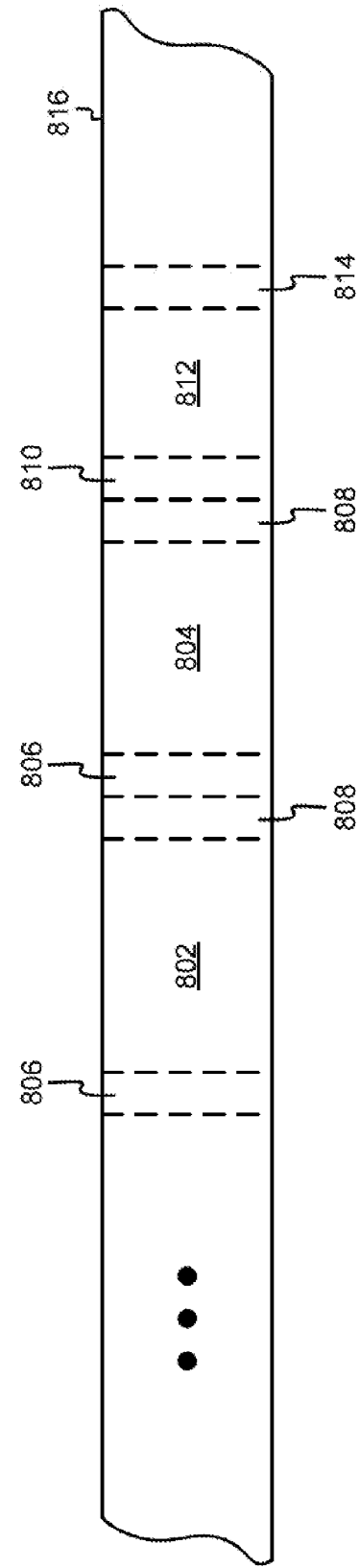

Now referring to FIGS. 8A-8B, a schematic diagram of a magnetic tape layout 800 is shown according to one embodiment. As an option, the present magnetic tape layout 800 may be implemented in conjunction with features from any other embodiment listed herein, such as those described with reference to the other figures. Of course, however, the magnetic tape layout 800 and others presented, herein may be used in various applications and/of in permutations which may or may not be specifically described in the illustrative embodiments listed herein. Further, the magnetic tape layout 800 presented herein, may be used in any desired environment. Thus FIG. 8 (and the other figures) should be deemed to include any and all possible permutations.

In FIG. 8A, a plurality of data sets 802 or files are shown stored to a magnetic tape volume 816 which may be housed in a tape cartridge, as described herein in various embodiments. The tape cartridge in ruin may be insertable into a tape drive to retrieve and/or write data to the magnetic tape volume 816. Of course, some other form of data may be stored to the magnetic tape volume 816, and data sets 802 are described for simplicity of the description. For the remainder of the descriptions herein, and in no way limiting on the inventions described according to various embodiments, data stored to a magnetic tape, such as magnetic tape volume 816, will be referred to as data sets.

As described previously, should a Control Data Set (CDS), which includes information about data sets stored to all magnetic tape volumes in a tape library and/or across a plurality of tape libraries in an installation, be unreadable, missing, not updated, or otherwise lacking location information for data stored to the magnetic tape volume 816, it may be cumbersome and time consuming to retrieve information about the data that is stored on the magnetic tape volume 816 from die magnetic tape volume 816.

Accordingly, a much more efficient and comprehensive mechanism to obtain information about all the data sets 802 on the magnetic tape volume 816 would be to create and maintain a Tape Volume Access Block (TVAB) 812 that is stored on the magnetic tape 816 after the last data set 804 on the magnetic tape 816. The TVAB 812 provides a single location on the magnetic tape volume 816 which contains metadata for all data sets 802 stored on the magnetic tape volume 816.

This metadata for each data set 802 may include some or all of the label information included in the CDS in various embodiments. However, the entries in the CDS may be different from the entries in the TVAB, and may not even exist on a one-to-one relationship. However, the TVAB typically will include one entry for each data set, but tins is not necessarily the case.

Furthermore, the metadata may include any of the following: a starting block identifier (ID) for each data set 802, an ending block ID for each data set 802, a physical position on the magnetic tape volume for each data set 802, a full data set name for each data set 802, construct names for the storage system being used such as storage management system (SMS), etc., a key for encrypting key information, and/or any other information that may be collected during output OPEN processing. End of Volume (EOV) processing, UNLOAD processing, and/or CLOSE processing of the magnetic tape volume 816, or any other oft repeated processing steps. The construct names in various approaches may include any common and/or appropriate construct names for a storage system and/or tape management system being used, such as Management Class, Storage Class, Storage Group, Data Class, etc.

In addition to the metadata described above, the TVAB 812 may also include magnetic tape volume statistics that may be useful in analytics or other functionality and that the tape drive tracks during the processing of a magnetic tape volume 816. The statistics may include any of the following over any predefined time frame: a number of bytes read, a number of bytes written, temporary error counters, etc. Typically, these statistics are only obtainable from the tape drive during unload processing and logged in a host data set. In this embodiment, these statistics are stored to the TVAB 812 in addition to being kept on the tape drive.

FIG. 8B is a close-up view taken from FIG. 8A of the last few data sets 802 stored to the magnetic tape volume 816. Referring again to FIG. 8B, each data set 802 may have stored therewith a header label 806 and a trailer label 808. Information from these labels 806, 808 may be included in the TVAB 812 in one embodiment.

Furthermore, in one embodiment, after the trailer label 808 associated with the last data set 804 and prior to the TVAB 812, a marker 810 indicating that the TVAB 812 follows may be stored to the magnetic tape volume 816 just prior to the TVAB 812. Moreover, just after the TVAB 812, an end of tape (EOT) 814 marker is written to the magnetic tape volume 816 indicating that there is no more data stored to the magnetic tape volume 816 past this EOT 814, as is typical for magnetic tape processing. Of course, had this magnetic tape volume 816 had data stored thereon prior to writing the current set of data sets 802, other data may exist past the EOT 814, but this data would be inaccessible in the present condition of the magnetic tape volume 816.

Figure 9A:
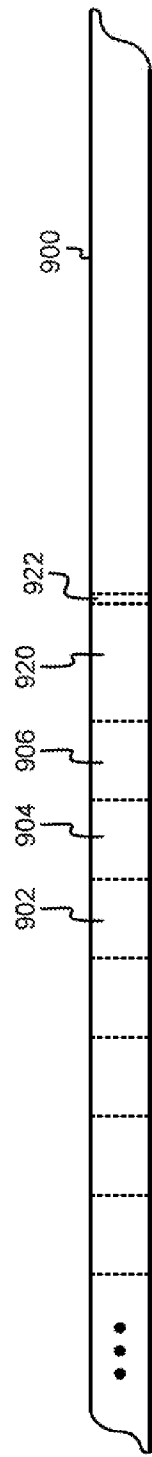
FIGS. 9A-9C show a series of schematic diagrams of writing data to a magnetic tape, according to one embodiment.
Figure 9B:
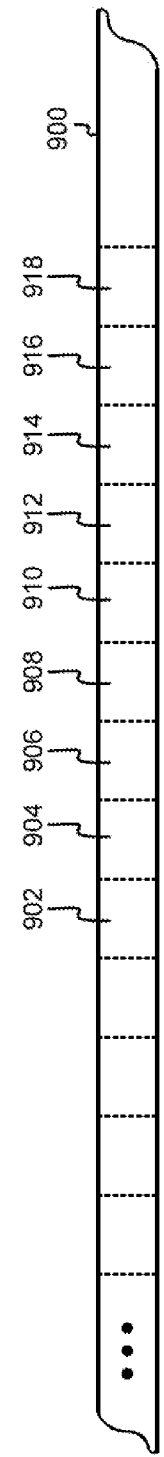
Figure 9C:
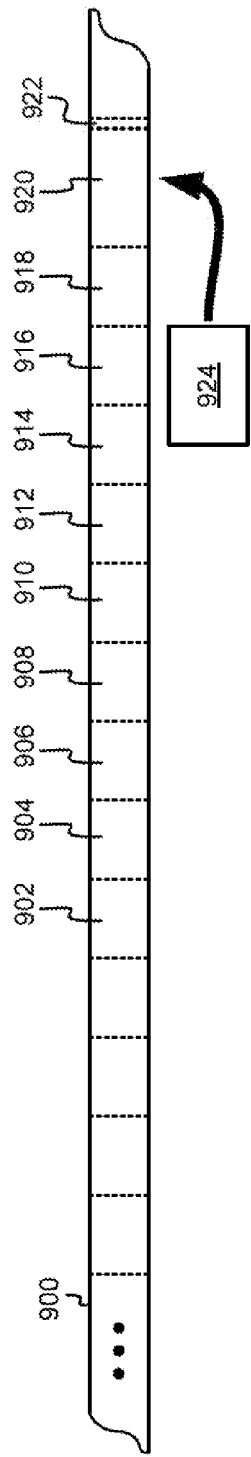

Now referring to FIGS. 9A-9C, data writing to a magnetic tape volume 900 having a TVAB 920 stored thereon prior to the EOT 922, is described according to one embodiment. During initial OPEN output (or some other command used to write data to a magnetic tape volume) processing, an existing TVAB 920 stored at the end of the last existing data set 918 on the magnetic tape volume 900 is read into a memory 924 up through a current data set sequence number to be created, minus one. That means that the information in the TVAB 920 will include information for all data sets, e.g., data sets 902, 904, 906, and all those preceding these data sets) currently stored to fee magnetic tape volume 900.

The memory 924 may be any storage capable of storing all of the information within the TVAB 920, such as a host memory, a DASD, etc. During output OPEN processing, EOV processing, and CLOSE processing, metadata for a next data set, e.g., data set 908, is appended to the existing copy of the TVAB 920 stored to the memory 924. In one embodiment, the TVAB 920 stored to the memory 924 may be an in-core copy resident on a tape management system, such as distributed file system (DFS), removable media manager (RMM), etc.

When multiple successive data sets, e.g., data sets 908, 910, 912, 914, 916, and 918 as shown, in FIG. 9B, are being written to the magnetic tape volume 900 at an end of currently stored data sets 902, 904, 906, metadata for each data set is stored in this existing copy of the TVAB 920 stored to the memory 924. Prior to, during, or alter all data sets have been synchronized to the magnetic tape volume 900 as shown in FIG. 9B, the TVAB 920 is updated with the metadata for each data set written/to be written.

Then, as shown in FIG. 9C, the TVAB 920 is written from the memory 924 to the magnetic tape volume 900 after the last written data set 918. When writing to a magnetic tape volume 900, current tape devices provide a logical end of volume indication at a point where there is sufficient room left on the magnetic tape volume 900 to write trailer labels.

In order to ensure that sufficient storage space is available to also write the TVAB 920 at the end of the magnetic tape volume 900, a command may be issued to the tape device during OPEN processing or some other point prior to writing data to the magnetic tape volume 900. This command directs the tape device which is accessing the magnetic tape volume 900 to provide the logical end of volume indication (EOT 922) at a point where both trailer labels and the TVAB 920 may be written after the last data set (e.g., data set 918 in FIG. 9C).

In one embodiment using a tape device, the TVAB 920 may be accessed rapidly by fast positioning to the current EOT 922. At that point, the entire TVAB 920, a specific entry in the TVAB 920, or a range of entries from the TVAB 920 may be read into memory, thereby minimizing input/output (TO) activity. In addition, since the TVAB 920 is written on the media itself, it is resident and travels with the magnetic tape volume 900 should it be transported from one location to another, such as across tape libraries or across entire installations, even from one remote location to another remote location. For example, should a magnetic tape volume be shipped from a tape library in Sacramento, USA, to a tape library in Stockholm, SWE, assuming each tape library is able to read the contents of the magnetic tape volume, fast access of the TVAB will be afforded to the tape library in Stockholm.

In another embodiment, the TVAB 920 may be indexed in some way such that it is quick and easy to locate individual metadata for a particular data set that is recorded in the TVAB 920. Any indexing known in the art may be used to index the TVAB 920.

According to another embodiment, a user exit may be included with the TVAB 920 dining CLOSE processing. This user exit may provide a mechanism for a user to specific any specific data to store or retrieve along with any desired routines to ran in order to collect/provide such data.

Figure 10:
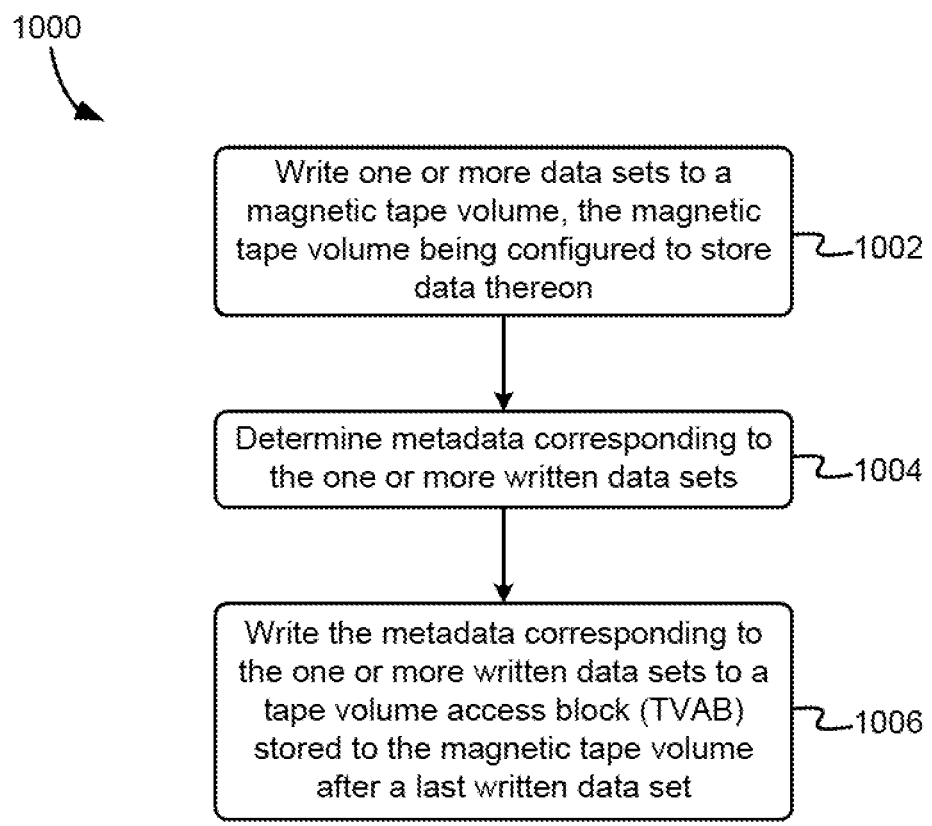
FIG. 10 is a flowchart of a method according to one embodiment.

FIG. 10 depicts a method 1000 for managing a magnetic tape volume, in accordance with one embodiment. Such method 1000 may be implemented by a tape device (e.g., a tape drive), a tape management system, a tape library controller, or some combination thereof among other possibilities. As an option, the present method 1000 may be implemented in conjunction with features from any other embodiment described herein, such as those described with reference to the other figures. Of course, however, such method 1000 and others presented herein may be used in various applications and/or in permutations which may or may not be specifically described in the illustrative embodiments listed herein. Further, the method 1000 presented herein may be used in any desired environment.

Method 1000 of FIG. 10 includes writing one or more data sets to a magnetic tape volume, the magnetic tape volume being configured to store data thereon as illustrated in operation 1002. The one or more data sets may be received by, obtained for, transferred to, or otherwise provided to a tape drive, tape device, or some other apparatus capable of storing data to a magnetic tape volume, as would be understood by one of skill in the art. The data sets include data to be stored to the magnetic tape volume.

In operation 1004, metadata corresponding to the one or more written data sets is determined. The metadata may include any desired information regarding the one or more data sets, the locations of the data sets on the magnetic tape volume, and/or the usage of the data sets on the magnetic tape volume, etc.

In one embodiment, the metadata may comprise at least one of location information associated with the one or more written data sets (where the data set is stored on the magnetic tape volume), and statistics associated with writing and reading of the magnetic tape volume (and possibly one or more of these data sets in particular).

In another embodiment, the location information may comprise at least one of: some or all label information included in a CDS stored to a tape management system, a starting block ID for each of the one or more written data sets, an ending block ID for each of the one or more written data sets, a physical position on the magnetic tape volume for each of the one or more written data sets, a rail data set name for each of the one or more written data sets, construct names appropriate for the tape management system being used, and/or a key for encrypting key information, among other possible location information metadata.

In another embodiment, the statistics may comprise a collection of any of the following over any predefined time frame: a number of bytes read, a number of bytes written, and/or temporary error counters. Of course, more or other metadata related to statistics of the usage of the magnetic tape volume may be collected and stored to the TVAB as well, as would be understood by one of skill in the art upon reading the present descriptions.

In one embodiment, the metadata may be determined during any of output OPEN processing, EOV processing, and/or CLOSE processing, among others. In more approaches, some other method or mechanism may be used to determine the metadata as would be known to one of skill in the art. In this way, the location information and/or the statistics may be gathered during any of these routines which are normally executed during manipulation of a magnetic tape volume, with some non-intrusive additional output steps included to capture the desired metadata for the TVAB.

In operation 1006, the metadata corresponding to the one or more written data sets is written to a TVAB stored to the magnetic tape volume after a last written data set. The TVAB may have any characteristic as described herein according to various embodiments. For example, the TVAB may be indexed, it may be stored after a last data set on the magnetic tape volume, etc.

In a further embodiment, method 1000 may further comprise reading an existing TVAB from the magnetic tape volume prior to writing the one or more data sets to the magnetic tape volume when the existing TVAB is stored to the magnetic tape volume, writing the existing TVAB to a storage memory, updating the existing TVAB in the storage memory with metadata corresponding to the one or more data sets to be written, and writing the updated TVAB from the storage memory to the magnetic tape volume after writing the one or more data sets at a position of the magnetic tape volume after a last written data set.

In yet another embodiment, method 1000 may further include positioning the magnetic tape volume to a position corresponding to an end of a last data set to stored to the magnetic tape volume to read the existing TVAB from the magnetic tape volume and to write a first of the one or more data sets to the magnetic tape volume, and positioning the magnetic tape volume to a position corresponding to an end of a last of the one or more data sets stored to the magnetic tape volume to write the updated TVAB from the storage memory to the magnetic tape volume.

According to one approach, method 1000 may include ensuring that sufficient free space is available on the magnetic tape volume after writing the one or more data sets to the magnetic tape volume to write the TVAB after a trailer label of a last data set. Although a tape device typically ensures that sufficient space remains to write a trailer label after the last stored data set, now the tape device will be instructed to leave enough space for the TVAB, which may be sufficiently larger than a simple trailer label.

For example, each entry in the TVAB (one entry per data set) may be about 400 to about 800 bytes in size (such as about 600 bytes). Accordingly, for a magnetic tape volume comprising 100,000 data sets, about 60 MB of space may be allocated for the TVAB at the end of the magnetic tape volume.

As mentioned above, the method 1000 may be implemented with any of the embodiments described and/or suggested herein. Moreover, in other embodiments, one or more of the operations of the method 1000 illustrated in FIG. 10 may be performed in part and/or in foil by a tape drive, e.g., see 160 of FIG. 7. However in other embodiments, the method 1000 of FIG. 10 may be performed using a computing device, a user interface, etc., or any other device capable of performing the operations thereof.

Figure 11:
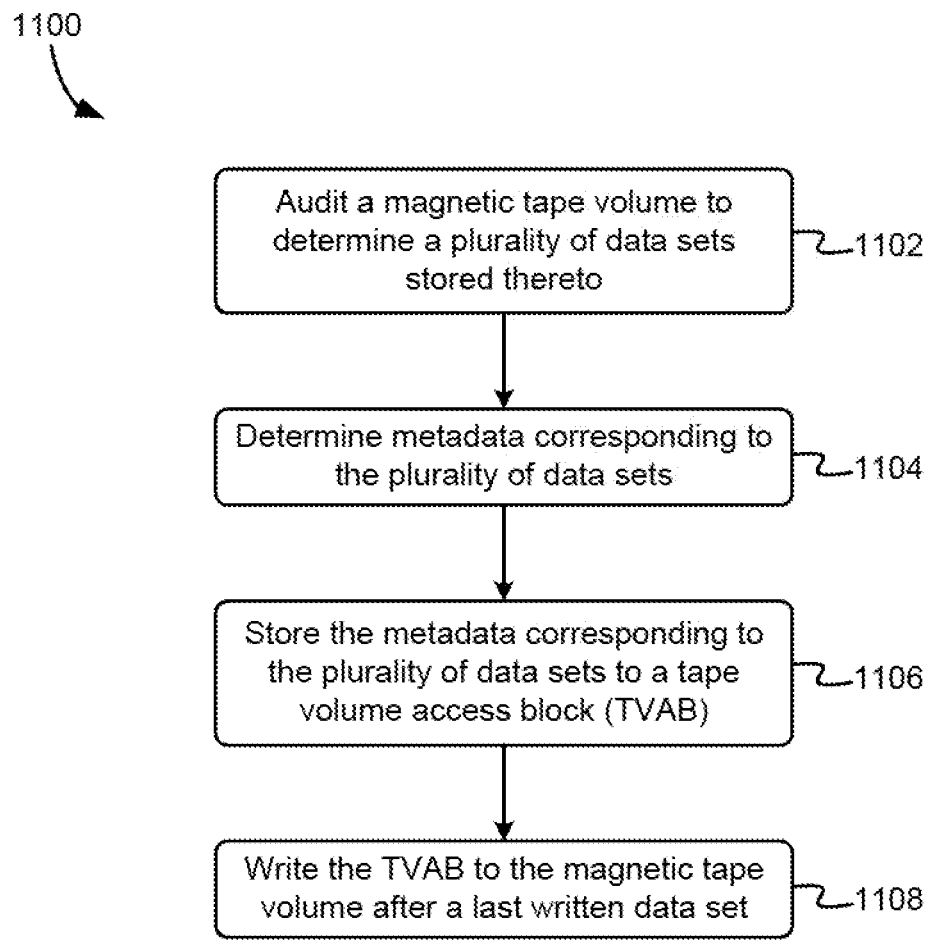
FIG. 11 is a flowchart of a method according to one embodiment.

Now referring to FIG. 11, another method 1100 for managing a magnetic tape volume is shown, in accordance with one embodiment. Such method 1100 may be implemented by a tape device (e.g., a tape drive), a tape management system, a tape library controller, or some combination thereof, among other possibilities. As an option, the present method 1100 may be implemented in conjunction with features from any other embodiment described herein, such as those described with reference to the other figures. Of course, however, such method 1100 and others presented herein may be used in various applications and/or in permutations which may or may not be specifically described in the illustrative embodiments listed herein. Further, the method 1100 presented herein may be used in any desired environment.

In operation 1102, a magnetic tape volume is audited to determine a plurality of data sets stored thereto. Any auditing technique known in the art may be used, such as reading each data set from the magnetic tape and determining location information thereof.

In operation 1104, metadata corresponding to the plurality of data sets is determined. This metadata may include location information associated with the one or more written data sets (where the data set is stored on the magnetic tape volume) and/or statistics associated with writing and reading of the magnetic tape volume (and possibly one or more of these data sets in particular).

In another embodiment, the location information may comprise at least one of: some or all label information included in a CDS stored to a tape management system, a starting block ID for each of the one or more written data sets, an ending block ID for each of the one or more written data sets, a physical position on the magnetic tape volume for each of the one or more written data sets, a full data set name for each of the one or more written data sets, construct names appropriate for the tape management system being used, and/or a key for encrypting key information, among other possible location information metadata.

In another embodiment, the statistics may comprise a collection of any of the following over any predefined time frame: a number of bytes read, a number of bytes written, and/or temporary error counters. Of course, more or other metadata related to statistics of the usage of the magnetic tape volume may be collected and stored to the TVAB as well, as would be understood by one of skill in the art upon reading the present descriptions.

In operation 1106, the metadata corresponding to the plurality of data, sets is stored to a TVAB as described herein in various approaches.

In operation 1108, the TVAB is written to the magnetic tape volume after a last written data set, as described herein in various approaches.

In a further embodiment, method 1100 may include sending the metadata corresponding to the plurality of data sets to a tape management system, and storing the metadata corresponding to the plurality of data sets to a CDS accessible to the tape management system. In this way, the CDS and the TVAB may be built in a same operation, thereby saving operating time and tape movement time.

It will be clear that the various features of the foregoing systems and or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic." a "circuit." "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber channel, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer. Those of skill in the art will understand that changes may be made with respect to the methods discussed above, including changes to the ordering of the choices of the methods of FIG. 9. Further, those of skill in the art will understand that differing specific component arrangements may be employed than those illustrated herein.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and then equivalents.

What is claimed is:

1. An apparatus, comprising a processor and logic integrated with and/or executable by the processor, the logic being configured to:
   position a magnetic tape volume to a position corresponding to an end of a last data set stored to the magnetic tape volume, the magnetic tape volume being configured to store data thereon;
   read an existing tape volume access block (TVAB) from the magnetic tape volume when the existing TVAB is stored to the magnetic tape volume;
   write the existing TVAB to a storage memory;
   write one or more data sets to the magnetic tape volume subsequent to reading the existing TVAB when the existing TVAB is stored to the magnetic tape volume;
   determine metadata corresponding to the one or more written data sets;
   update the existing TVAB in the storage memory with metadata corresponding to the one or more written data sets; and
   write the updated TVAB from the storage memory to the magnetic tape volume after writing the one or more data sets at a position of the magnetic tape volume after a last written data set.

2. The apparatus as recited in claim 1, wherein the logic is further configured to:
   write a first of the one or more data sets to the magnetic tape volume after positioning the magnetic tape volume to the position corresponding to the end of the last data set stored to the magnetic tape volume; and
   position the magnetic tape volume to a position corresponding to an end of a last of the one or more data sets stored to the magnetic tape volume to write the updated TVAB from the storage memory to the magnetic tape volume.

3. The apparatus as recited in claim 1, wherein the TVAB is indexed.

4. The apparatus as recited in claim 1, wherein the metadata comprises at least one of:
   location information associated with the one or more written data sets; and
   statistics associated with at least one of: writing and reading of the magnetic tape volume.

5. The apparatus as recited in claim 4, wherein the location information comprises at least one of:
   a starting block identifier (ID) for each of the one or more written data sets;
   an ending block ID for each of the one or more written data sets;
   a physical position on the magnetic tape volume for each of the one or more written data sets;
   a full data set name for each of the one or more written data sets;
   construct names appropriate for a tape management system being used; and
   a key for encrypting key information.

6. The apparatus as recited in claim 1, wherein the metadata comprises statistics associated with writing and reading of the magnetic tape volume, wherein the statistics comprise a collection of any of the following over any predefined time frame: a number of bytes read, a number of bytes written, and temporary error counters.

7. The apparatus as recited in claim 4, wherein the logic is further configured to gather the location information and/or the statistics during output open processing, end of volume processing, and/or close processing of the magnetic tape volume.

8. The apparatus as recited in claim 1, wherein the logic is further configured to ensure that sufficient free space is available on the magnetic tape volume after writing the one or more data sets to the magnetic tape volume to write the TVAB after a trailer label of a last data set.

9. A method for managing a magnetic tape volume, the method comprising:
   reading an existing tape volume access block (TVAB) from a magnetic tape volume prior to writing one or more data sets to the magnetic tape volume when the existing TVAB is stored to the magnetic tape volume, the magnetic tape volume being configured to store data thereon;
   writing the existing TVAB to a storage memory;
   writing the one or more data sets to the magnetic tape volume;
   determining metadata corresponding to the one or more written data sets;
   updating the existing TVAB in the storage memory with the metadata corresponding to the one or more written data sets;
   writing the updated TVAB from the storage memory to the magnetic tape volume after writing the one or more data sets at a position of the magnetic tape volume after a last written data set.

10. The method as recited in claim 9, further comprising:
    sending the metadata corresponding to the one or more written data sets to a tape management system; and
    storing the metadata corresponding to the one or more written data sets to a control data set (CDS) accessible to the tape management system.

11. The method as recited in claim 9, further comprising:
    positioning the magnetic tape volume to a position corresponding to an end of a last data set to stored to the magnetic tape volume to read the existing TVAB from the magnetic tape volume and to write a first of the one or more data sets to the magnetic tape volume; and
    positioning the magnetic tape volume to a position corresponding to an end of a last of the one or more data sets stored to the magnetic tape volume to write the updated TVAB from the storage memory to the magnetic tape volume.

12. The method as recited in claim 9, wherein the TVAB is indexed.

13. The method as recited in claim 9, wherein the metadata comprises at least one of:
    location information associated with the one or more written data sets; and
    statistics associated with writing and reading of the magnetic tape volume.

14. The method as recited in claim 13, wherein the location information comprises at least one of:
    some or all label information included in a control data set (CDS) stored to a tape management system;
    a starting block identifier (ID) for each of the one or more written data sets;
    an ending block ID for each of the one or more written data sets;
    a physical position on the magnetic tape volume for each of the one or more written data sets;
    a full data set name for each of the one or more written data sets;

construct names appropriate for the tape management system being used; and a key for encrypting key information.

15. The method as recited in claim 13, wherein the statistics comprise a collection of any of the following over any predefined time frame: a number of bytes read, a number of bytes written, and temporary error counters.

16. The method as recited in claim 13, further comprising gathering the location information and/or the statistics during output open processing, end of volume processing, and/or close processing of the magnetic tape volume.

17. The method as recited in claim 9, further comprising ensuring that sufficient free space is available on the magnetic tape volume after writing the one or more data sets to the magnetic tape volume to write the TVAB after a trailer label of a last data set.

18. A method for managing a magnetic tape volume, the method comprising:

auditing a magnetic tape volume to determine a plurality of data sets stored thereto;

determining metadata corresponding to the plurality of data sets, the metadata comprising location information associated with the one or more written data sets, including more than one type of metadata selected from the group consisting of:

a starting block identifier (ID) for each of the data sets stored to the magnetic tape volume;

an ending block ID for each of the data sets stored to the magnetic tape volume;

a physical position on the magnetic tape volume for each of the data sets stored to the magnetic tape volume;

a full data set name for each of the data sets stored to the magnetic tape volume;

construct names appropriate for a tape management system being used; and a key for encrypting key information;

storing the metadata corresponding to the plurality of data sets to a tape volume access block (TVAB) on a storage memory;

positioning the magnetic tape volume to a position corresponding to an end of a last of the plurality of data sets stored to the magnetic tape volume; and writing the TVAB from the storage memory to the magnetic tape volume after the end of the last of the plurality of data sets stored to the magnetic tape volume, wherein the metadata further comprises statistics associated with writing the magnetic tape volume, reading the magnetic tape volume, or a combination of writing and reading the magnetic tape volume.

19. The method as recited in claim 18, further comprising:

sending the metadata corresponding to the plurality of data sets to a tape management system; and storing the metadata corresponding to the plurality of data sets to a control data set (CDS) accessible to the tape management system.

* * * * *